United States Patent
Britz et al.

(10) Patent No.: US 6,227,374 B1
(45) Date of Patent: May 8, 2001

(54) PROCESS AND FLOATATION DEVICE FOR THE REMOVAL OF INTERFERING MATERIALS FROM AN AQUEOUS FIBER PULP SUSPENSION

(75) Inventors: Herbert Britz, Ravensburg Weissenau; Axel Gommel, Ravensburg; Herbert Holik, Ravensburg; Martin Kemper, Ravensburg; Almut Kriebel, Weingarten; Wolfgang Mannes, Ravensburg-Bavendorf; Boris Reinholdt, Waldburg; Klaus Steinbild, Ravensburg, all of (DE)

(73) Assignee: Voith Sulzer Papiertechnik Patent GmbH, Ravensburg (DE)

( * ) Notice: Subject to any disclaimer, the term of this patent is extended or adjusted under 35 U.S.C. 154(b) by 0 days.

(21) Appl. No.: 09/115,672

(22) Filed: Jul. 15, 1998

(30) Foreign Application Priority Data

Jul. 16, 1997 (DE) .................................. 197 30 464

(51) Int. Cl.[7] .............................. B03D 1/02; B03D 1/14; B03D 1/24; D21C 5/02
(52) U.S. Cl. ............................. 209/164; 209/170; 162/4
(58) Field of Search ........................ 162/4; 209/164, 209/168, 170; 210/221.2

(56) References Cited

U.S. PATENT DOCUMENTS

| | | |
|---|---|---|
| 2,005,742 | * 6/1935 | Hines . |
| 3,865,719 | * 2/1975 | Holik et al. . |
| 4,045,243 | 8/1977 | Wohlert . |
| 4,190,522 | 2/1980 | Trä . |
| 4,288,319 | * 9/1981 | Heijs et al. . |
| 4,399,028 | * 8/1983 | Kile et al. . |
| 4,592,834 | 6/1986 | Yang . |
| 4,620,926 | * 11/1986 | Linck et al. . |
| 4,737,272 | * 4/1988 | Szatkowski et al. . |
| 4,952,308 | * 8/1990 | Chamberlin et al. . |
| 5,022,984 | 6/1991 | Pimley et al. . |
| 5,028,315 | 7/1991 | Cruea et al. . |
| 5,238,538 | * 8/1993 | Jagannadh et al. . |
| 5,279,424 | 1/1994 | Britz et al. . |
| 5,437,784 | 8/1995 | Meinecke et al. . |
| 5,510,039 | 4/1996 | Bassler et al. . |
| 5,529,190 | 6/1996 | Carlton et al. . |

FOREIGN PATENT DOCUMENTS

| | | |
|---|---|---|
| 2409235 | 10/1975 | (DE) . |
| 2709711 | 9/1978 | (DE) . |
| 2737009 | 2/1979 | (DE) . |
| 3127290 | 1/1983 | (DE) . |
| 3401161 | 11/1985 | (DE) . |
| 19516519 | 7/1996 | (DE) . |
| 0432928 | 6/1991 | (EP) . |
| 2708008 | 1/1995 | (FR) . |
| 61-201093 | * 5/1986 | (JP) . |

* cited by examiner

Primary Examiner—Thomas M. Lithgow
(74) Attorney, Agent, or Firm—Greenblum & Bernstein, P.L.C.

(57) ABSTRACT

The process is designed for the flotation of interfering materials from an aqueous fibrous pulp suspension and is in particular used in the processing of printed or used paper that is otherwise contaminated. The separation of gas bubbles of the suspension occurs in a flotation layer that has a maximum thickness of approximately 100 mm. The process also achieves good flotation results in fibrous pulp suspensions that have a fiber pulp content significantly larger than 1% by weight, for example around 2% by weight. A flotation apparatus is provided for performing the flotation process. The apparatus includes a flotation vessel, an inlet, an outlet, and a skimmer device.

23 Claims, 4 Drawing Sheets

PROCESS AND FLOATATION DEVICE FOR THE REMOVAL OF INTERFERING MATERIALS FROM AN AQUEOUS FIBER PULP SUSPENSION

CROSS-REFERENCE TO RELATED APPLICATION

The present application claims the priority under 35 U.S.C. 119 of German Patent Application No. 197 30 464.8, filed on Jul. 16, 1997, the disclosure of which is expressly incorporated by reference herein in its entirety.

BACKGROUND OF THE INVENTION

1. Field of the Invention

The invention relates to a process and apparatus for the removal of interfering materials from an aqueous fiber pulp suspension.

2. Discussion of Background Information

Processes of the aforementioned type are used in order to remove at least a portion of the interfering pulp particles suspended in a fibrous pulp suspension containing fiber pulp. It is common knowledge that a foam or floating slurry, containing the material to be removed, is created in a flotation process. A typical case of application of such a process is the processing of aqueous fibrous pulp suspensions that are produced from printed used paper, whereby the ink is already dissolved from the fibers so that it can be floated out. The flotation process described here utilizes the differences between the fibrous pulp and the undesirable solid particles such that the fibrous pulp, due to its hydrophilic nature remains in the fibrous pulp suspension, while the described solid particles exhibit hydrophobic behavior and therefore end up with the air bubbles in the foam. Aside from the ink particles there are also a large number of additional materials that are hydrophobic and are able to be separated from the fibrous pulp by flotation. Such materials are in particular adhesives, fine synthetic material particles, and possibly also resins. When the fibers are to be separated from contamination, i.e. not all solid particles are to be sorted out, a selective flotation process is performed. The term "flotation de-inking", also used, is generally not only used for the removal process of ink particles, but also used in a more general sense for the selective flotation of contamination of fibrous pulp suspensions.

The state of the art in regards to flotation processes for fibrous pulp suspensions is already at a very advanced state. There are thus solutions which are quite suitable in removing a large portion of the solid particles by flotation. However, the effect weakens when the amount of fibers in the suspension is relatively high, for example 2%, instead of the conventional amount of around or below 1%. In such cases problems often occur since the resistance for the gas bubbles is already high with a higher fiber content, thereby making it difficult to separate the suspension. Higher pulp densities, on the other hand, are desirable in order achieve a higher throughput.

SUMMARY OF THE INVENTION

The aim of the invention is therefore to create a flotation process in which good cleaning results can be achieved even when the suspension for such processes has a relatively high fibrous pulp content.

By the present invention, the difficulties, caused by the high viscosity of the suspension, can be overcome. The gas bubbles, loaded with interfering materials, have an increased resistance while reaching from the suspension into the flotation foam by following their tendency to rise. However, because of the fact that the flotation process is executed with a relatively thin flotation layer, the gas bubbles only have to travel a very short distance. In embodiments of the process in accordance with the invention, the gas bubbles' tendency to rise can be enhanced by applying a gravity field which is greater than earth's gravity. Another possibility makes provisions to accelerate the rise of the gas bubbles with the aid of impulses or vibrations.

Thus, an aspect of the invention is to provide a process for removing interfering materials from a fibrous pulp suspension by generating air bubbles in the form of a gas, collecting the interfering materials by using the gas bubbles, and removing the interfering materials with a flotation foam. The fibrous pulp suspension and the gas bubbles are introduced into a flotation layer having a maximum thickness of approximately 100 mm so as to separate the gas bubbles and the fibrous pulp suspension.

Another aspect of the process is to provide a flotation layer with a thickness of approximately 50 mm.

A feature of the process is to provide the gas bubbles as air bubbles, in the alternative, the bubbles may be provided by a gas that is lighter than air.

Another feature of the process is to directly add the gas bubbles to the flotation layer of the suspension and to admix the bubbles prior to the time the fibrous pulp suspension enters the flotation layer.

Another aspect is to transmit vibrations to the flotation layer and to transmit the vibrations by shaking at least a part of the flotation element that is in contact with the flotation layer. Another feature is to transmit the vibrations by using an agitating element, or hydraulic and/or pneumatic impulses.

Another concept of the process is to clean a fibrous pulp suspension that has a fiber pulp content of approximately 2% by weight in the flotation layer and to dilute the pulp suspension after the addition of the bubbles and transform the suspension in the flotation layer and to add bubbles of different sizes to the flotation layer so that the bubble size varies in the direction of flow of the suspension. A feature is to also vary the size of the bubbles in a rising direction of the bubbles.

Another feature is to create a local turbulence in a separation region of the flotation layer, the separation region being between the suspension and the flotation foam.

A further aspect of the process is to provide a flotation procedure wherein the flotation layer extends approximately 150 mm in a flow direction of the flotation layer.

A feature of the invention is to subject the suspension to an initial processing in which the suspension is fed at a height that is greater that a thickness of the flotation layer and to provide a flotation layer that extends in its flow direction a distance of between approximately 1 mm and approximately 500 mm.

A further feature is to create a micro-turbulence in the suspension prior to the initial processing and to accelerate the suspension to at least twice the average flow velocity during the entry into the flotation layer.

Another characteristic of the invention is to divert the cleaned suspension layer immediately downstream of the cleaning process and to perform the separation in a gravity field that is greater than earth's gravity while yet another aspect of the invention is to perform the separation in a flotation cyclone.

Still a further aspect is to add some of the gas bubbles to the suspension before entry into the flotation cyclone and add additional bubbles afterwards and to perform the process in a centrifuge.

A feature of the invention is to provide an apparatus in which the flotation process is performed. The apparatus includes a flotation vessel which receives the suspension to be cleaned, an inlet for receiving the suspension and an outlet for discharging the cleaned suspension. A skimmer element is provided for separating flotation foam, created in the flotation process, from the suspension. The skimmer separates a flotation chamber receiving the suspension by setting a filling height that does not exceed approximately 100 mm.

An aspect of the invention is to provide an apparatus for carrying out the flotation process is also to provide a flotation chamber that is substantially planar and to provide the chamber with a corrugated bottom wall so that the corrugations extend perpendicular to a flow direction of the fibrous pulp suspension and to supply gas by way of pipes located in the bottom wall so ass to add gas bubbles to parts of the flotation layers of the fibrous pulp suspension, the gas bubbles being added to the flotation layers having a predetermined depth.

Another aspect is to provide the apparatus with an incline extending in the direction of the skimmer and to provide the gas supply box so that it extends along the flotation chamber at least over a portion of a flow path of the suspension.

Other features of the invention include providing a wall with a large number of openings positioned between the gas supply and the flotation chamber, provide the wall as a perforated plate or a flexible fabric and to provide an apparatus in which an air supply is connected to the gas supply so as to feed a pulsating flow of gas to the suspension.

BRIEF DESCRIPTION OF THE DRAWINGS

The present invention is further described in the detailed description which follows, with reference to the noted plurality of drawings by way of non-limiting examples of preferred embodiments of the present invention. In the drawings, like reference numerals represent similar parts throughout the several views of the drawings, and wherein.

DETAILED DESCRIPTION OF THE INVENTION

The particulars shown here are by way of example and for purposes of illustrative discussion of the embodiments of the present invention only and are presented in the cause of providing what is believed to be the most useful and readily understood description of the principles and conceptual aspects of the present invention in more detail than is necessary for the fundamental understanding of the present invention, the description taken with the drawings making apparent to those skilled in the art how the several forms of the present invention may be embodied in practice.

Figure 1:
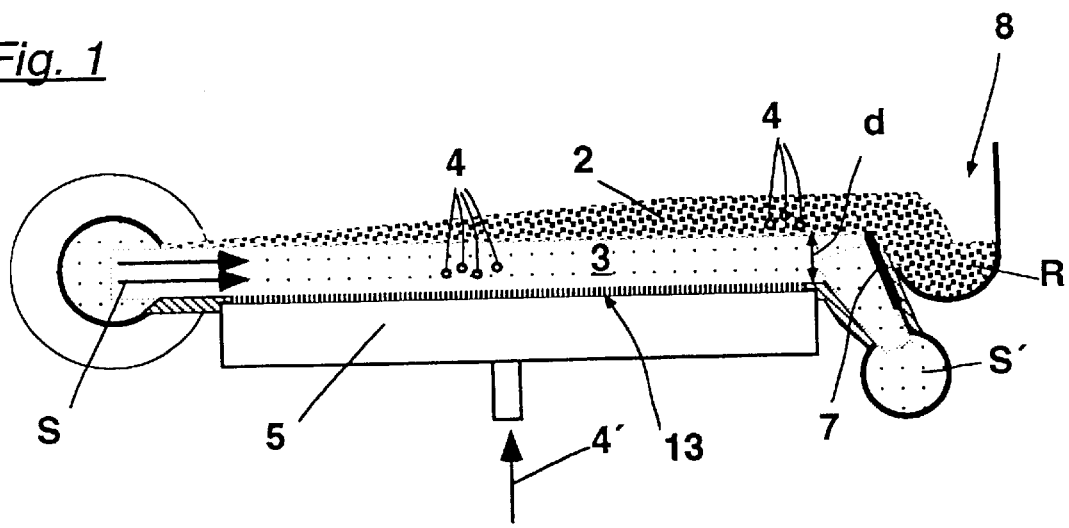
FIG. 1 is a schematic representation of a flotation device for carrying out the flotation process in accordance with the invention.

The basic steps of the embodiment of the process in accordance with the invention are shown in FIG. 1. The fibrous pulp suspension S is fed into a flotation device. A flotation layer 3 with a thickness d of no more than 100 mm is created in a flotation vessel 13. This thickness is specified by a dividing or separating element 7, which is here provided as a height-adjustable foam weir over which the flotation foam 2, for example, is drained into the foam gutter 8. The relatively small thickness of the flotation layer is critical for solving the problem of obtaining good cleaning results. The dimension should be understood, such that the stated thickness d can not be larger in the effective flotation area—here referenced as flotation layer 3. However, this does not mean that, for example, entirely different conditions can not exist up-stream. Vessels, for example, in which the suspension is held can exhibit a depth that goes far beyond this dimension. Such an embodiment is explained later with the aid of FIG. 8. It is known that a very large number of gas bubbles, in particular air bubbles, are required for the flotation process, of which only a few are illustrated here as gas bubbles 4. The gas bubble ascend through the flotation and accumulate in the flotation foam 2 that floats on top of the flotation layer 3 and are afterwards removed as reject R with the aid of the foam gutter 8. The foam gutter 8 is here arranged close to the down-stream end of the flotation layer 3. However, the foam gutter 8 can also be positioned sideways so that the flotation foam 2 runs off perpendicular to the flow.

Figure 2:
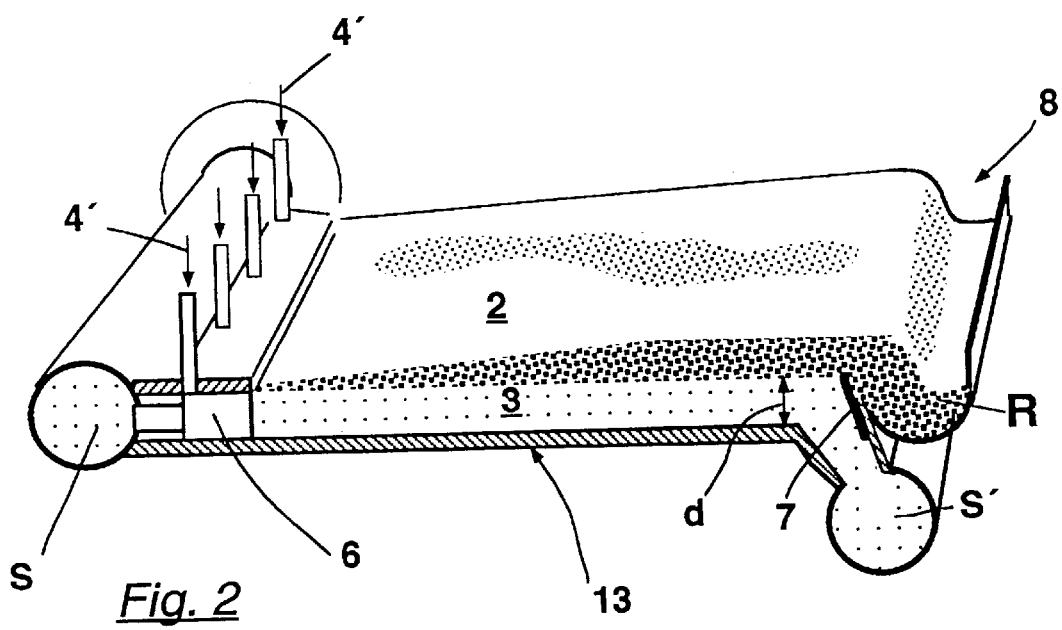
FIG. 2 is a schematic perspective illustration of a variation of the device of FIG. 1.

The gas bubbles required for the flotation process can be admixed in the suspension feed system or, as illustrated here, with the aid of a gas feed box 5, located below the flotation layer 3. Gas 4' is added to the gas feed box 5. The gas may be air or a gas lighter than air, for example, helium or hydrogen. The gas bubbles may be of the same size or different sizes. An optimal bubble size depends upon which interfering material is to be separated by flotation. Generally, the larger particles require larger air bubbles. The bubble size can be changed by changing the air velocity in the layer diffuser. It is advantageous to feed the supplied gas 4' in pressure pulses so that vibrations are created in the flotation layer 3. When a flexible and perforated wall, for example an air-permeable fabric, is used between the gas supply box 5 and the flotation chamber 3', such a wall can also vibrate. Another possibility for the creation of advantageous vibrations can be, for example, providing for a shaking motion on one or more walls of the flotation chamber 3'. The gas treatment of the suspensions through the flotation process is known and can also be varied. FIG. 2 thus shows a similar device as FIG. 1., for example. However, in it a number of staggered diffusing devices 6, which have the function of creating micro-turbulence and, at the same time, of enabling a very simple gas feed mechanism 4' by injection, are installed in the inlet region of the suspension S to the flotation layer 3. In particular, when the flotation thickness is relatively thin, the turbulence, in particular with pulp densities around 2%, can loosen up the suspension and promote the ascending effect of the air bubbles that are mixed with interfering materials.

The flotation devices shown in FIGS. 1 and 2 have a flotation vessel 13 that is positioned essentially horizontally.

Figure 3:
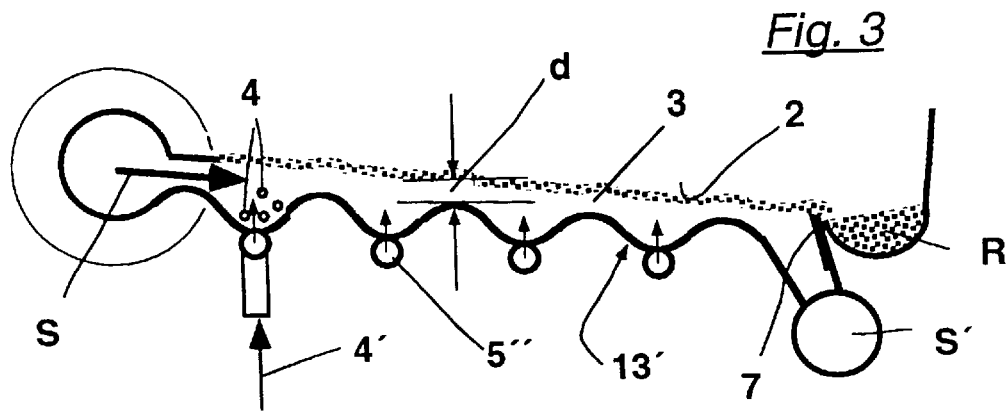
FIG. 3 is a side view of another variation of the device of FIG. 1.
Figure 4:
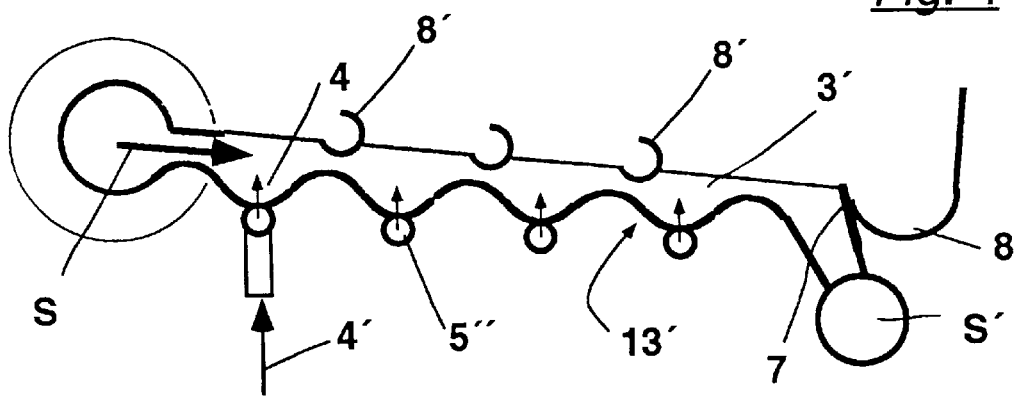
FIG. 4 is a side view of a further variation of the device of FIG. 1.

However, it is easily conceivable to provide a slight incline, in particular in the direction of the foam gutter 8, in order to improve the foam drainage. The flotation devices shown in FIGS. 3 and 4 are, as an example, arranged at an incline. However, these two figures show additional special features. Because the wall of the flotation vessel 13' is constructed in a corrugated fashion, the flow of the fibrous pulp suspension S is directed in the flotation chamber 3 in such a manner that the length of the rising or ascending path of the gas bubbles 4 is different from one section of the chamber to the next. It is particularly advantageous to provide for the transport of the gas 4' with the aid of gas supply pipes 5", which are each mounted at deep, vertically extended regions of the corrugated wall. This arrangement provides for an increased time for the interfering material to attach to the air bubbles, while permitting a short target time for the separation of the gas bubbles from the fibrous pulp suspension. The separation can therefore unfold in a relatively short section, corresponding to the thickness d. Another improvement can be derived from the flotation device shown in FIG. 4, wherein the bottom wall is also corrugated. Several foam gutters 8', arranged sequentially in the direction of flow, are positioned along the separation line between the fibrous pulp suspension S and the foam 2. The produced foam can be removed relatively quickly, utilizing the above-described advantage of a corrugated bottom wall. The advantages, resulting from the repeated skimming of the flotation foam 2 by sequentially arranged foam gutters, are of course also possible in the flotation devices shown in FIGS. 1 or 2.

Figure 5:
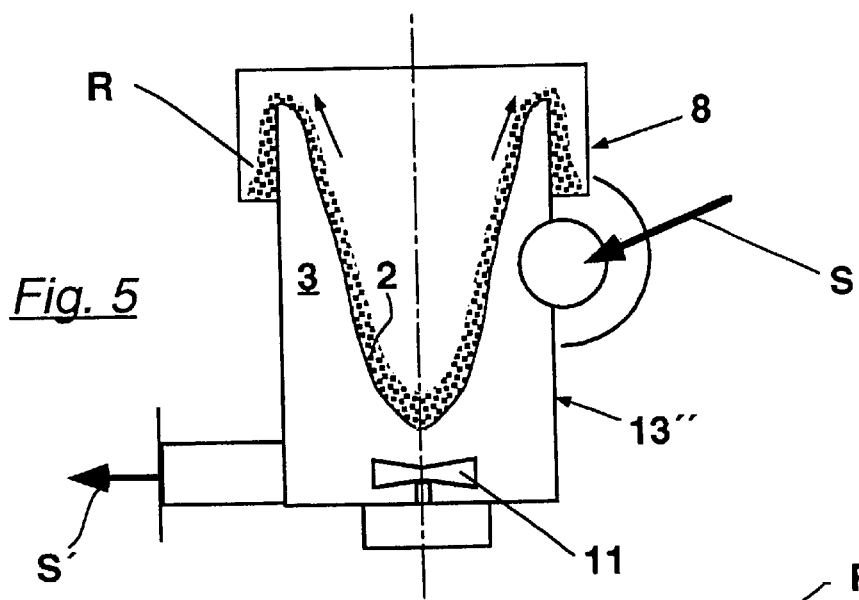
FIG. 5 is a schematic side view of a centrifugal flotation device of the invention.
Figure 6:
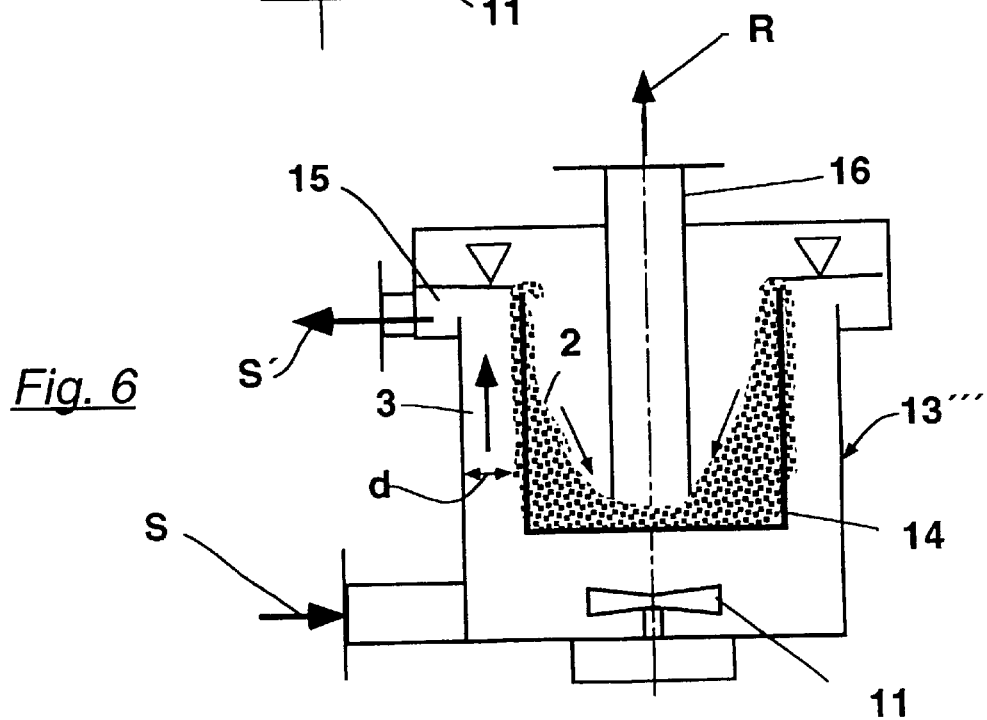
FIG. 6 is a variation of the device of FIG. 5.
Figure 7:
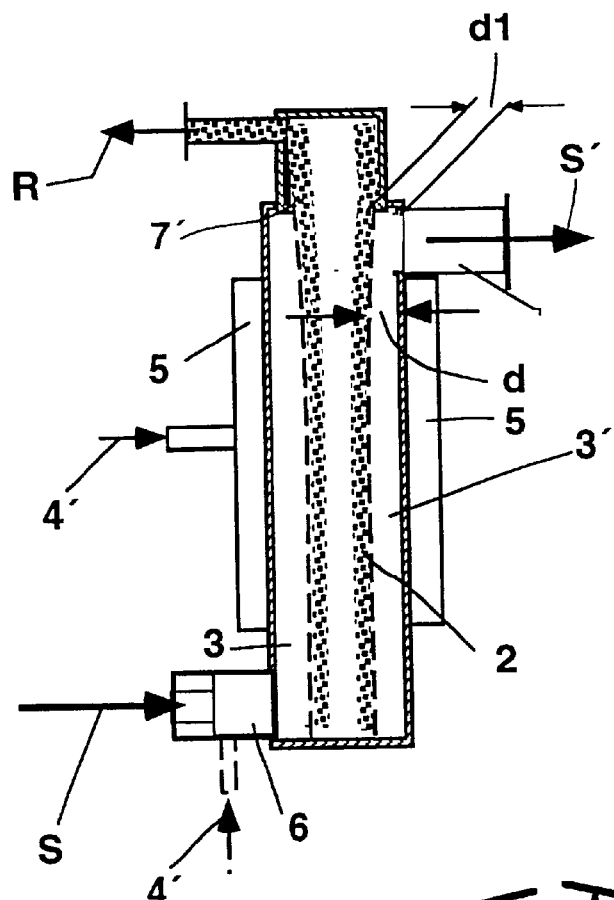
FIG. 7 is a schematic side view of a flotation cyclone of the present invention.

Another efficient improvement can be achieved if the flotation process is executed in a flotation device in which a force field, critical for the rising or ascending tendency of the gas bubbles, is strengthened with the aid of centrifugal forces. Specific possibilities for the utilization of centrifugal forces in the flotation process are shown in FIGS. 5 to 7. FIG. 5 illustrates a flotation device with a tangential inlet for the fibrous pulp suspension S, whereby the tangential inlet initiates a rotational flow within the flotation vessel 13". The rotational flow can also be assisted by a rotor 11 (eddy prop). The rotor 11 may strengthen the rotational movement of the suspension which, without the rotor, can only be achieved by tangential inflow. The rotor also contributes to the mixing of the gas bubbles and the suspension and it provides an energy supply to further the absorption of interfering materials into the air bubbles. In addition, this rotor can also be constructed and operated such that the mixing of the fibrous pulp suspension S with the gas bubbles is promoted; the attachment of the interfering particles to the air bubbles can be improved as well. The rotation results in a swirling motion and an accumulation of the flotation foam 2 on its surface. This also results in a relatively short rising or ascending paths of the gas bubbles through the suspension. The produced flotation foam 2 drains toward the exterior and can be removed as reject R. The cleaned suspension S' in the shown example is here diverted, radially or tangentially, at the bottom part of the flotation vessel 11.

The flotation device shown in FIG. 6 also has a round, for example cylindrical, flotation vessel 13'''. In it, the fibrous pulp suspension S is added in the bottom region and put into a rotational flow, which again can be enhanced by a rotor 11. The suspension extends into the flotation layer 3 above, which is constructed in the form of a ring that is bound or adhered to the outside by the flotation vessel 13''' and to the inside by a foam trough 14. As a result of the rotational motion of the suspension, the gas bubbles push towards the inside, are transported upwards, and thus end up in the foam trough 14. The cleaned suspension flows radially outward into an accepted-pulp ring chamber 15 and is removed therefrom. The flotation foam 2, that has accumulated in the foam trough 14 can, for example, be suctioned off as reject using a foam pipe 16.

The use of cyclones for the flotation process is generally known, but in the embodiment shown in FIG. 7 one can use the advantage already mentioned since the flotation cyclone is constructed such that the flotation layer 3 remains relatively thin. The dividing or separating element 7', here constructed as a ring weir on the foam skimmer that projects over the inner wall of the flotation cyclone by a distance d1, serves this purpose. Thus, not only a very short rising or ascending path of the gas bubbles is made possible for the separation of the foam 2 and the suspension S, but, due to frictional effects at the edges, results in a further loosening of the suspension and thereby an improved rising or ascending speed of the gas bubbles. In a flotation cyclone, the gas supply can again be provided in different ways, for example by admixing of gas 4' immediately before entry into the flotation vessel (illustrated in dashes) or with the aid of a porous exterior wall of a flotation vessel that is enclosed by a gas supply box 5. Vibrations can also be produced in the various ways already mentioned. The solution stated last should be particularly advantageous with thin flotation layers 3—in accordance with the invention—and a corresponding high pulp density in the suspension. In the flotation cyclone shown here, the suspension is added over one or more staggered diffusion devices 6, producing a good mixing of the gas bubbles with the suspension and an improved attachment of interfering material to the gas bubbles. The turbulence that can be created in such staggered diffusion devices also favor the separation of gas bubbles and the suspension.

Figure 8:
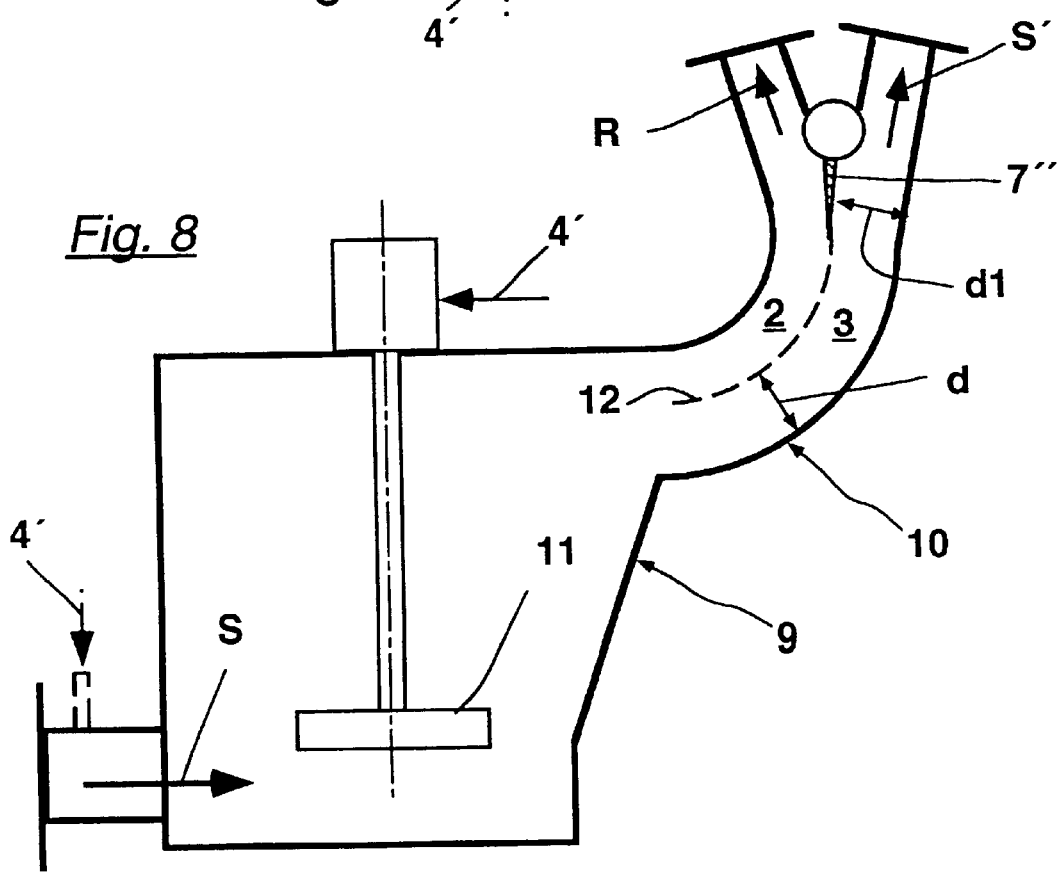
FIG. 8 is a schematic side view of another aspect of the present invention.

In the flotation device illustrated in FIG. 8, the flotation layer 3 is produced at the outlet of a mixing vessel 9 in a relatively short flow path. Due to the curvature of the outlet piece 10, the flotation gravity field is increased by centrifugal forces. The gravitational force is increased by the centrifugal force by a multiple number of times, for example, up to approximately 10 g and even 20 g or 30 g. A mixing zone is preferably provided up-stream, i.e. in front of the flotation section 3, wherein a good mixing of air and fibrous pulp suspension and an intensive attachment of the interfering materials to the gas bubbles is achieved at the same time with the aid of a mixing device 11. The mixing device 11 can either be a mixer or a stationary element. An initial separation of gas bubbles and suspension can take place within the mixing vessel 9. The boundary 12 between the suspension S' and the flotation foam 2 is indicated with a dashed, curved line in the figure. The dividing or separating element 7" which is constructed as an adjustable rotating weir.

Figure 9:
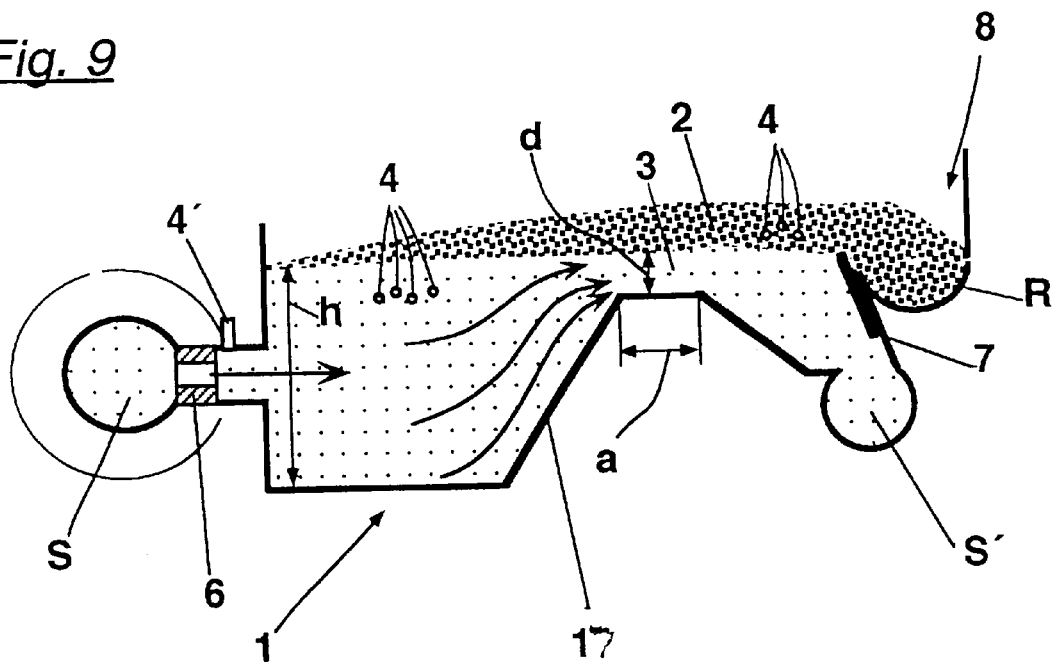
FIG. 9 is a schematic side view of another flotation device of the present invention; and, FIG. 10 is a schematic side view of a further flotation device of the present invention.
Figure 10:
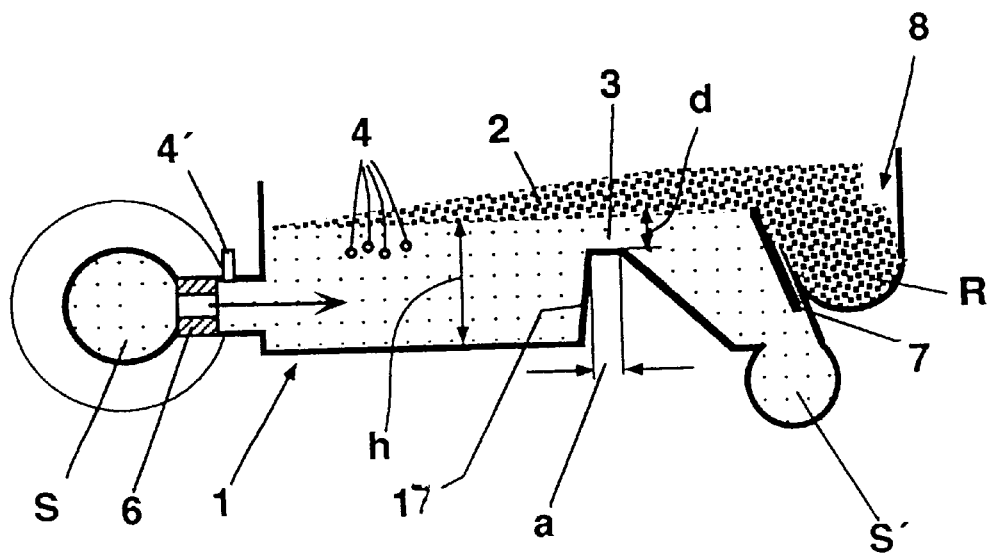

FIGS. 9 and 10 show flotation devices in which the processes are varied further. The fibrous pulp suspension S in both examples is first fed to an initial flotation process 1 and then reaches the flotation layer 3, described previously. With the aid of this combination, a maximum separation effect in a single flotation device is achieved. A portion of the interfering materials migrate into the flotation foam 2 in the region of the initial flotation process 1, in particular that portion that can be floated out particularly quickly. The other portion of interfering materials that have to be floated out under particularly favorable conditions is extracted afterwards from the flotation layer 3. Thus, it is advantageous that the contamination concentration is already lowered significantly due to the initial flotation process. In particular with the use of an initial flotation process, it is advantageous to feed the fibrous pulp suspension S into the flotation vessel via a turbulence-producing device, such as a staggered diffusion device 6. The reason for this is that the microturbulence created thereby can significantly improve the spontaneous flotation process.

In the majority of cases it is advantageous that the fibrous pulp suspension S is accelerated in the transition from the initial flotation process 1 to the flotation layer 3. The reason for this is that the shear forces caused by the acceleration assist in loosening of the fibrous pulp, which can be important with pulp densities that lie significantly above 1%. The acceleration can be achieved by allowing the height h in the area of the initial flotation process 1 to be significantly larger than the layer thickness d of the flotation layer 3. The acceleration is a direct result of application of Bernoulli's Law due to the reduction of the cross-sectional area at the entrance to the flotation layer. In the embodiment in accordance with FIG. 10, the gas bubbles also only have a short rising or ascending height to the flotation foam in the initial flotation process 1, and micro-turbulence, introduced by the staggered diffusion devices, has an optimal effect. The terminal wall 17 is almost vertical, which leads to an abrupt acceleration with correspondingly high shear forces in the suspension. Viewed as a whole, the micro-turbulence introduced during the initial flotation 1 are utilized for the flotation process, and in the subsequent acceleration process, additional shear forces are produced that again serve the flotation process.

It is noted that the foregoing disclosure has been provided merely for the purpose of explanation and is in no way to be construed as limiting of the present invention. While the present invention has been described with reference to a preferred embodiment, it is understood that the words that have been used herein are words of description and illustration, rather than words of limitation. Changes may be made, within the purview of the appended claims, as presently stated and as amended, without departing from the scope and spirit of the invention in all of its aspects. Although the present invention has been described herein with reference to particular means, materials and embodiments, the present invention is not intended to be limited to the particulars disclosed herein, rather, the present invention extends to all functionally equivalent structures, methods and uses, such as are within the scope of the appended claims.

What is claimed is:

1. A process for removal of interfering materials from an aqueous fibrous pulp suspension, comprising:
    generating gas bubbles;
    collecting the interferring materials by use of the gas bubbles; and
    removing the interferring materials with a flotation foam,
    wherein the fibrous pulp suspension and the gas bubbles are introduced to form a flotation layer having a maximum thickness of approximately 100 mm in which the gas bubbles separate from the fibrous pulp suspension, and
    wherein the gas bubbles are introduced directly into the flotation layer.

2. A process in accordance with claim 1, wherein the flotation layer has a maximum thickness of approximately 50 mm.

3. A process in accordance with claim 1, wherein the gas bubbles are mainly air bubbles.

4. A process in accordance with claim 1, wherein the gas bubbles are provided by a gas that is lighter than air.

5. A process in accordance with claim 1, wherein the gas bubbles are admixed with the fibrous pulp suspension before the fibrous pulp suspension enters the flotation layer.

6. A process in accordance with claim 1, wherein the fibrous pulp suspension has a fiber pulp content of at least approximately 2% by weight in the flotation layer.

7. A process in accordance with claim 1, wherein the gas bubbles are of different sizes and are added to the flotation layer, whereby bubble size varies in a direction of flow of the suspension.

8. A process in accordance with claim 1, including adding gas bubbles of different sizes to the flotation layer, whereby the size varies in a rising direction of the gas bubbles.

9. A process in accordance with claim 1, further comprising: creating vibrations in a separation region of the flotation layer, the separation region being between the suspension and the flotation foam.

10. A process in accordance with claim 1, wherein the flotation layer extends at least approximately 150 mm in a flow direction of the flotation layer.

11. A process in accordance with claim 1, wherein the flotation layer extends in the direction of flow to a length of between approximately 1 mm and approximately 500 mm.

12. A process in accordance with claim 1, wherein a cleaned suspension is diverted immediately down-stream of the flotation layer.

13. A process in accordance with claim 1, wherein the separation takes place in a gravity field that is greater than earth's gravity.

14. A process in accordance with claim 13, wherein the separation is executed in a flotation cyclone.

15. A process in accordance with claim 14, wherein a portion of the gas bubbles is added to the suspension before entry into the flotation cyclone and remaining portion of the gas bubbles is added afterward.

16. A process in accordance with claim 14, wherein the separation is executed in a centrifuge.

17. A process for removal of interfering materials from an aqueous fibrous pulp suspension, comprising:
    introducing the fibrous pulp suspension into a flotation chamber;
    generating gas bubbles, whereby, in the flotation chamber, the gas bubbles separate from the fibrous pulp suspension to form a flotation layer having a maximum thickness of approximately 100 mm;
    transmitting vibrations to the flotation layer to further separate the gas bubbles and the fibrous pulp suspension;
    collecting the interferring materials via the gas bubbles into a flotation foam; and
    removing the flotation foam, and, thereby, the interferring materials.

18. A process in accordance with claim 17, wherein the vibrations are transmitted by shaking at least part of a flotation element that is in contact with the flotation layer.

19. A process in accordance with claim 17, wherein the vibrations are transmitted to the fibrous pulp suspension by an agitating element.

20. A process in accordance with claim 17, wherein the vibrations are transmitted to the fibrous pulp suspension by hydraulic impulses.

21. A process in accordance with claim 17, wherein the vibrations are transmitted to the fibrous pulp suspension by pneumatic impulses.

22. A process in accordance with claim 21, including applying the pneumatic impulses to a gas provided to supply the gas bubbles.

23. The process in accordance with claim 17, wherein the gas bubbles are introduced directly into the flotation layer.

* * * * *